Patented Mar. 26, 1940

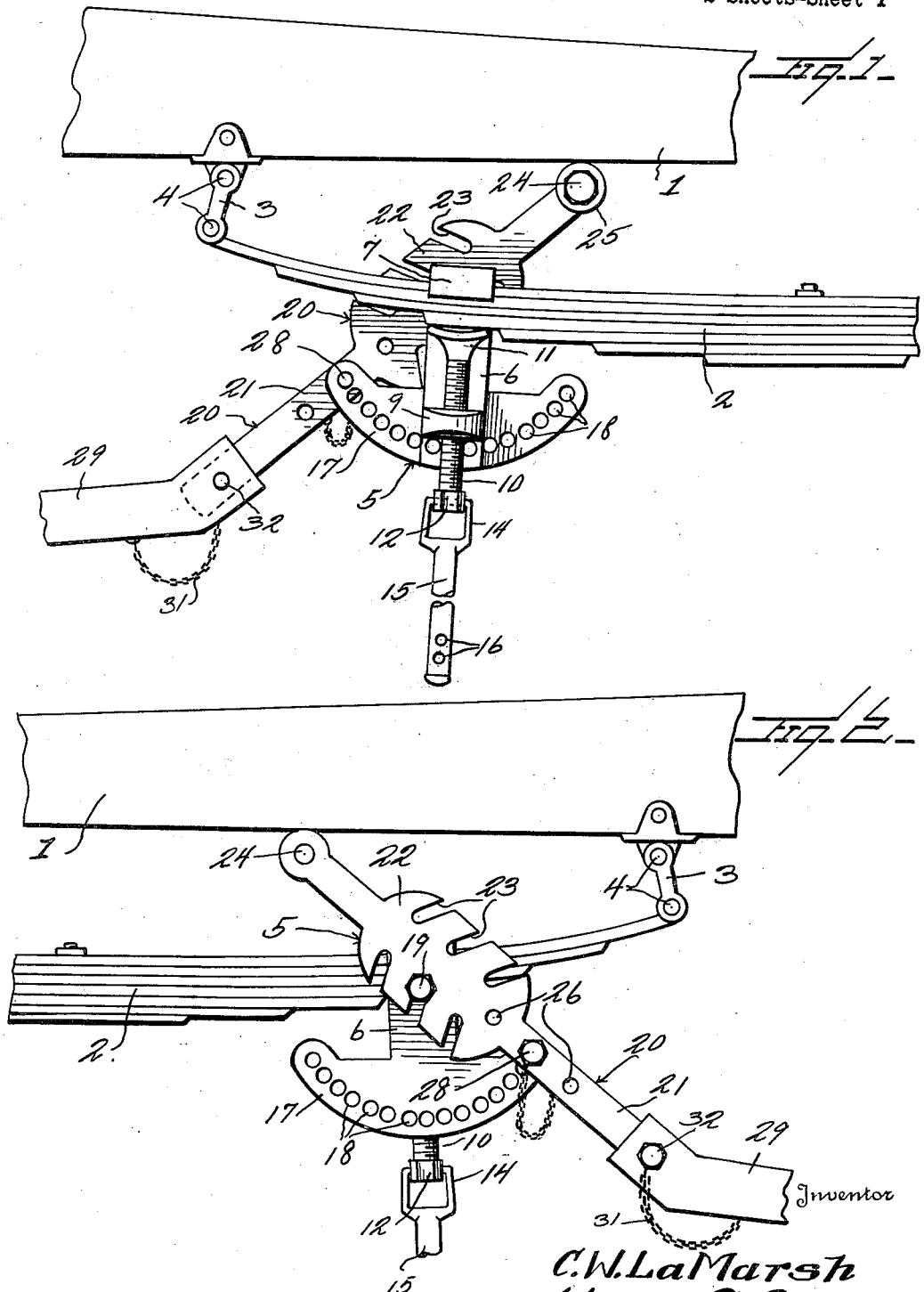

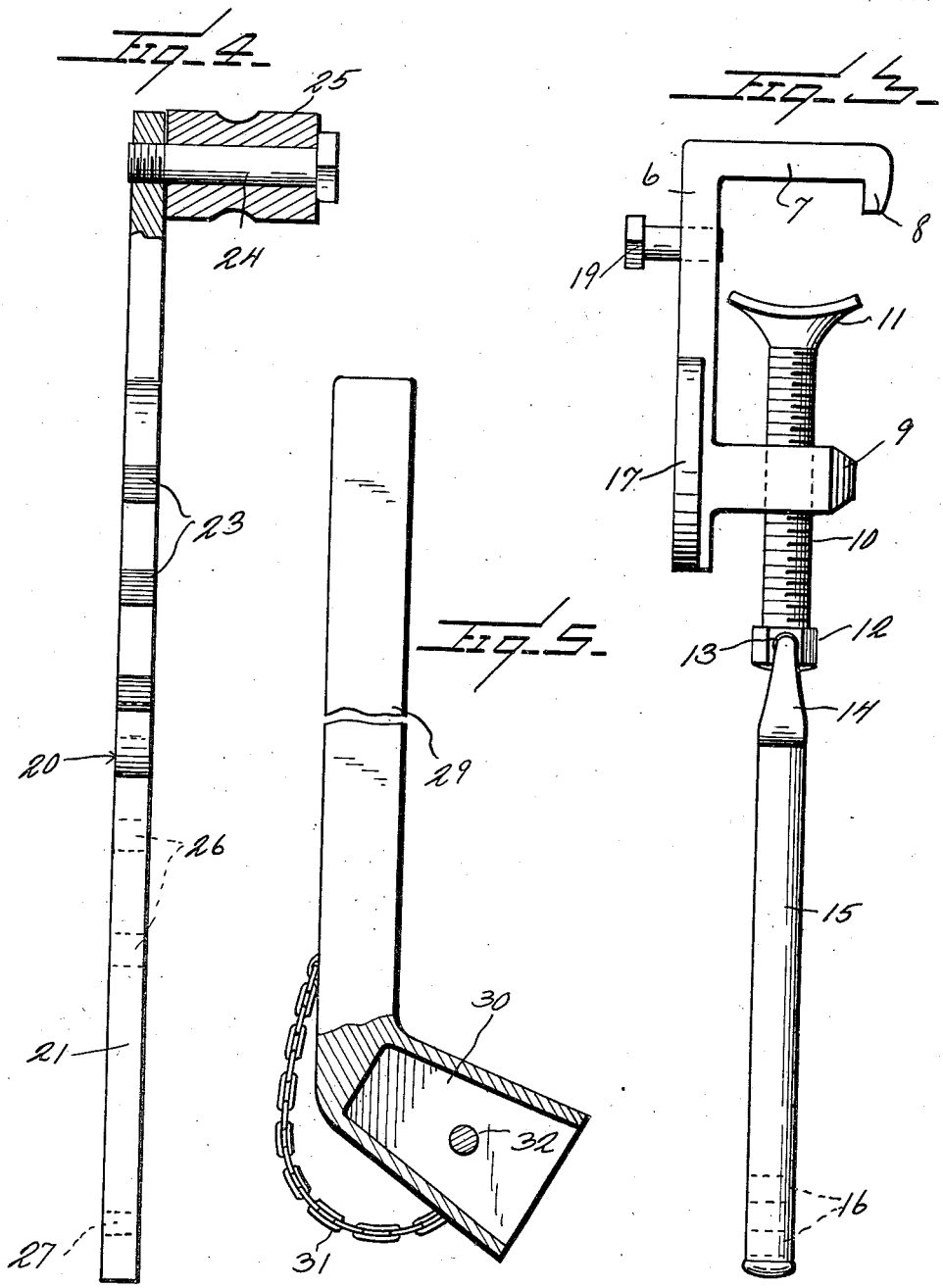

2,194,981

UNITED STATES PATENT OFFICE 2,194,981

SPRING JACK

Charles W. La Marsh, Alton, Ill., assignor of one-third to Harry W. Patton, Alton, Ill., and one-third to Harry A. Patton, Grafton, Ill.

Application October 24, 1939, Serial No. 301,053

8 Claims. (Cl. 254—131)

This invention relates to the class of tools and pertains particularly to a tool designed for use in performing certain operations upon motor vehicles.

The primary object of the present invention is to provide a novel tool or implement by means of which the operation of removing spring shackle bolts and bushings may be accomplished in an easier, safer and quicker manner than is possible at the present time.

Another object of the invention is to provide an implement by means of which the rocking of the motor vehicle body may be easily accomplished for the purpose of detecting squeaks or other noises in the springs, the device being so constructed that each spring may be individually worked on so that the squeak may be more easily located than by the present practice of rocking the entire car body by the process of standing on the running-board and jarring or swaying the car body.

Still another object of the invention is to provide a novel and improved implement by means of which the leaves of an automobile spring may be easily and quickly separated so that such leaves might be thoroughly greased or oiled.

The invention will be best understood from a consideration of the following detailed description taken in connection with the accompanying drawings forming a part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in elevation of the implement embodying the present invention, showing the same applied and viewing the implement from the inner side of the vehicle spring.

Fig. 2 is a view similar to Fig. 1, but viewing the implement from the opposite side or outside of the spring.

Fig. 3 is a detail view of the spring gripper portion of the implement.

Fig. 4 is a detail view, partly in section, of the rocking or lever unit of the implement.

Fig. 5 is a view in elevation, a part being in section, of an extension lever for the rocker unit.

Referring now more particularly to the drawings, the Figs. 1 and 2 illustrate the application of the present implement to a vehicle spring in the position necessary for relatively moving the spring and chassis frame to facilitate the removal of shackle bolts or bushings. The vehicle chassis frame is indicated by the numeral 1 and the spring by the numeral 2. The spring is connected at the end shown, with the frame 1, by a shackle 3 and pins or bolts 4 which pass through the shackle and couple the ends thereof to the frame and spring. When the weight of the vehicle is applied to the spring, the downwardly directed force imposed upon the bolts 4 would prevent the removal of these bolts for the removal of the shackle and it will, therefore, be obvious that the chassis frame would have to be lifted slightly with respect to the spring so as to remove this weight from the bolts before the bolts could be taken out or before the bushings surrounding the bolts could be removed. The present device, positioned upon the spring and adapted to engage the frame in the manner illustrated in Figs. 1 and 2, facilitates the removal of these bolts and comprises the following structure.

The spring gripping portion of the implement is indicated generally by the numeral 5 and consists of an elongated plate 6 which at one end terminates in the laterally extending jaw 7 which terminates in the bill 8, which is directed toward the remote end of the plate 6 and parallel therewith, as shown. This jaw is designed for engagement over the top of the spring 2 in the manner shown in Fig. 1. Adjacent the opposite end of the plate 6 is an integral stud 9 which is in spaced relation with the jaw 7 and has a threaded aperture therethrough for the reception of the elongated screw 10 which carries upon the end between the stud 9 and jaw 7, the moving jaw 11. The opposite end of this screw has the head 12 through which an aperture 13 is formed transversely to the screw. Extending through the aperture 13 is a link 14 carried by a handle or crank arm 15. This crank arm adjacent its rear end is provided with a pair of apertures 16 for the purpose hereinafter stated.

Formed integrally with the plate 6 is a transversely extending plate 17 which is here shown as being of arcuate form along the edge remote from the jaw 7, and this plate has formed through it the arcuate series of apertures 18 which are arranged on an arc struck from the center of a pivot stud 19 which is secured to the plate 6 at the end adjacent the jaw 7 and upon the side of the plate opposite from the jaw.

In association with the gripper unit 5, there is used a unit which will be referred to as the rocker unit and which is designated as a whole by the numeral 20, as this unit is used by rocking or oscillating it with respect to the gripper unit 5 for accomplishing the various jobs which are to be carried out upon the vehicle with the implement. This rocker unit 20 comprises an elongated lever bar 21 which intermediate its ends and nearer to one end than the other, is laterally enlarged to provide the plate 22, the longitudinal edges of which have formed therein a number of slots 23 which are disposed obliquely to the length of the bar. At the end of the bar nearest to the plate 22 there is secured the laterally extending pivot pin 24 on which is supported a roller 25. The periphery of this roller projects slightly beyond the adjacent end of the bar as shown in Fig. 4. As is shown in Figs. 1 and 2, the slots 23 are inclined or obliquely disposed with respect to the bar 21, so that their open ends are farther from the roller 25 than their inner or closed ends. At the end of the plate 22 remote from the roller 25, there are formed a longitudinally extending series of apertures 26 and adjacent the end of the bar remote from the roller is a single coupling pin receiving aperture 27.

Attached to the bar 21 adjacent the apertures 26 is a locking pin 28 which is employed to couple the bar 21 with the plate 17 by passing through alined ones of the apertures 18—26 as shown in Fig. 1.

The numeral 29 designates an extension lever or arm which is designed for attachment to the end of the bar 21 through which the aperture 27 is formed. This extension lever at one end is formed to provide a socket 30 adapted to receive the outer end of the bar 21, that is, the end remote from the roller 25. Attached to the extension lever or bar 29 by the chain 31, is a locking pin 32 which is designed to extend through apertures formed in the opposite sides of the socket 30 and through the aperture 27 when the outer end of the bar 21 is disposed in the socket.

In the use of the present implement, where it is desired to relieve the weight upon the spring shackle bolts for the removal of the bolts or the bushings, the spring gripper is applied to the spring in the manner shown in Figs. 1 and 2, by engaging the jaw 7 over the top of the spring and threading the screw 10 inwardly until the under side of the spring is engaged, so that the spring will be securely gripped and the plate 6 and parts carried thereby will be securely attached to the spring. The rocker unit 20 is then disposed with the roller 25 against the underside of the chassis frame between the latter and the spring and the fulcrum pin 19 is engaged in one of the slots 23. By bearing down upon the outer end of the bar 21 either by applying the necessary pressure by hand directly to the bar 21 or by applying this pressure to the bar through the medium of the extension bar 29 attached in the manner illustrated in Figs. 1 and 2, the necessary separation of the spring and chassis may be accomplished to relieve the weight upon the shackle bolts. It will be noted that when the parts are in the position stated, the portion of the bar 21 having the apertures 26 therein will be disposed adjacent the apertures 18 of the gripper unit plate 17 and the gripper unit and rocker may, therefore, be locked together to hold the spring and chassis in the desired position by extending the locking pin 28 through the one of the apertures 26 nearest the row of apertures 18 and through one of these latter apertures.

To use the implement for the purpose of separating the spring leaves so as to grease the same or for the purpose of rocking the chassis in order to detect squeaks in the spring, the gripper unit 5 is shifted on the spring to the central part of the spring where it will grip between the jaws 7 and 11 all of the spring leaves. By then engaging the rocker on the fulcrum pin 19 and the roller 25 against the underside of the frame and oscillating the rocker on the pin 19, it will be readily seen that the chassis frame and spring can be separated to the extent where the leaves will be separated sufficiently to facilitate the insertion of grease or oil between them. It will also be readily apparent that with the implement attached in this manner, an up-and-down movement of the frame relative to the spring may be easily accomplished so as to determine whether or not the particular spring to which the implement is attached is noisy or squeaks.

From the foregoing, it will be readily apparent that the tool herein described may be easily and quickly applied to a vehicle spring for the performance of the several operations stated and that when applied, these operations may be carried out with greater ease and safety to the operator than is possible with the methods at present in use.

What is claimed is:

1. An implement for the purpose stated, comprising a gripper member, a fulcrum pin carried by the gripper member, a rocker member comprising a bar having at one longitudinal edge means for rockably engaging it with said fulcrum pin, means at one end of said bar for engaging a body of work adjacent to a body with which the gripper unit is connected, and means for coupling said rocker unit with said gripper unit at a selected point along an arcuate path struck from said fulcrum pin.

2. An implement for the purpose described, comprising a gripper unit including a plate body, said gripper unit including a pair of relatively movable jaws between which a body may be engaged to secure said plate to the body, a rocker unit comprising an elongated bar, a fulcrum pin carried by said gripper unit, means forming a part of said bar for detachably coupling the bar with said fulcrum pin, a work engaging body carried by said bar at one end, and means for securing said bar to said plate at any one of a selected series of locations arranged on an arc struck from said fulcrum pin.

3. An implement for the purpose described, comprising a gripper unit including a plate body, said gripper unit including a pair of relatively movable jaws between which a body may be engaged to secure said plate to the body, a rocker unit comprising an elongated bar, a fulcrum pin carried by said gripper unit, means forming a part of said bar for detachably coupling the bar with said fulcrum pin, a work engaging body carried by said bar at one end, means for securing said bar to said plate at any one of a selected series of locations arranged on an arc struck from said fulcrum pin, and an extension lever bar detachably coupled to the end of the first bar remote from the said work engaging body.

4. An implement for separating a vehicle chassis frame and an adjacent spring, comprising a spring gripping unit including a plate, a fulcrum pin carried by said plate, a rocker unit comprising an elongated bar, means at one edge of the bar for detachably coupling the same to said fulcrum pin, a body carried by said bar at one end for engagement with the underside of the adjacent chassis frame between the same and the gripper unit engaging spring, and means for securing said rocker unit to said gripper unit in a selected number of positions of the rocker unit relative to the gripper unit.

5. An implement of the character described for use in association with a vehicle chassis frame and spring, comprising a plate body having a jaw at one end adapted to engage over the spring, a movable jaw carried by the plate for coaction with the first jaw to secure the plate to the spring, a fulcrum pin carried by the plate and extending laterally therefrom on the side thereof remote from the first jaw, an elongated bar having means designed to receive the fulcrum pin whereby the bar may be oscillated relative to the plate, a member secured to an end of the bar and extending laterally therefrom for engagement with the chassis frame between the same and the spring, and means for securing the bar to the plate in any one of a number of positions to which it may be oscillated on the fulcrum pin.

6. An implement of the character described for use in association with a vehicle chassis frame and spring, comprising a plate body having a jaw at one end adapted to engage over the spring, a movable jaw carried by the plate for coaction with the first jaw to secure the plate to the spring, a fulcrum pin carried by the plate and extending laterally therefrom on the side thereof remote from the first jaw, an elongated bar having means designed to receive the fulcrum pin whereby the bar may be oscillated relative to the plate, a member secured to an end of the bar and extending laterally therefrom for engagement with the chassis frame between the same and the spring, means for securing the bar to the plate in any one of a number of positions to which it may be oscillated on the fulcrum pin, said last means comprising a plate carried by the first plate remote from said jaw thereof and having a series of apertures formed therein on an arc struck from the fulcrum pin as a center and the said bar having an aperture arranged for selective register with any one of said arcuate series of apertures, and a pin for extension through the bar aperture and the selected one of the series of apertures.

7. An implement of the character described for use between a vehicle chassis frame and spring, comprising a plate body having a laterally extending jaw at one end adapted for engagement over the top of a spring, a stud carried by the plate, a screw threaded through the stud and carrying a jaw for coaction with the first jaw, a fulcrum pin carried by the plate and extending therefrom on the side opposite from the jaws, said plate having formed therethrough at the end remote from the first jaw an arcuate series of apertures struck from the fulcrum pin as a center, a bar having a series of slots cut in an edge thereof and adapted for selective engagement with said fulcrum pin and having a longitudinally extending series of apertures corresponding in number with the slots, a roller carried upon the bar at one end and extending laterally therefrom for engagement with the underside of the chassis frame between the same and the spring, and a locking pin adapted for selective engagement in one of said longitudinal series of apertures and one of said arcuate series of apertures.

8. An implement of the character described, for use between a vehicle chassis frame and spring, comprising a plate body having a laterally extending jaw at one end adapted for engagement over the top of a spring, a stud carried by the plate, a screw threaded through the stud and carrying a jaw for coaction with the first jaw, a fulcrum pin carried by the plate and extending therefrom on the side opposite from the jaws, said plate having formed therethrough at the end remote from the first jaw an arcuate series of apertures struck from the fulcrum pin as a center, a bar having a series of slots cut in an edge thereof and adapted for selective engagement with said fulcrum pin and having a longitudinally extending series of apertures corresponding in number with the slots, a roller carried upon the bar at one end and extending laterally therefrom for engagement with the underside of the chassis frame between the same and the spring, a locking pin adapted for selective engagement in one of said longitudinal series of apertures and one of said arcuate series of apertures, and an extension lever adapted for detachable engagement with the end of said bar remote from the end carrying said roller.

CHARLES WM. LA MARSH.